April 29, 1969        S. WARNER        3,441,707
MACHINE FOR MAKING WIRE TERMINALS
Filed Aug. 10, 1965
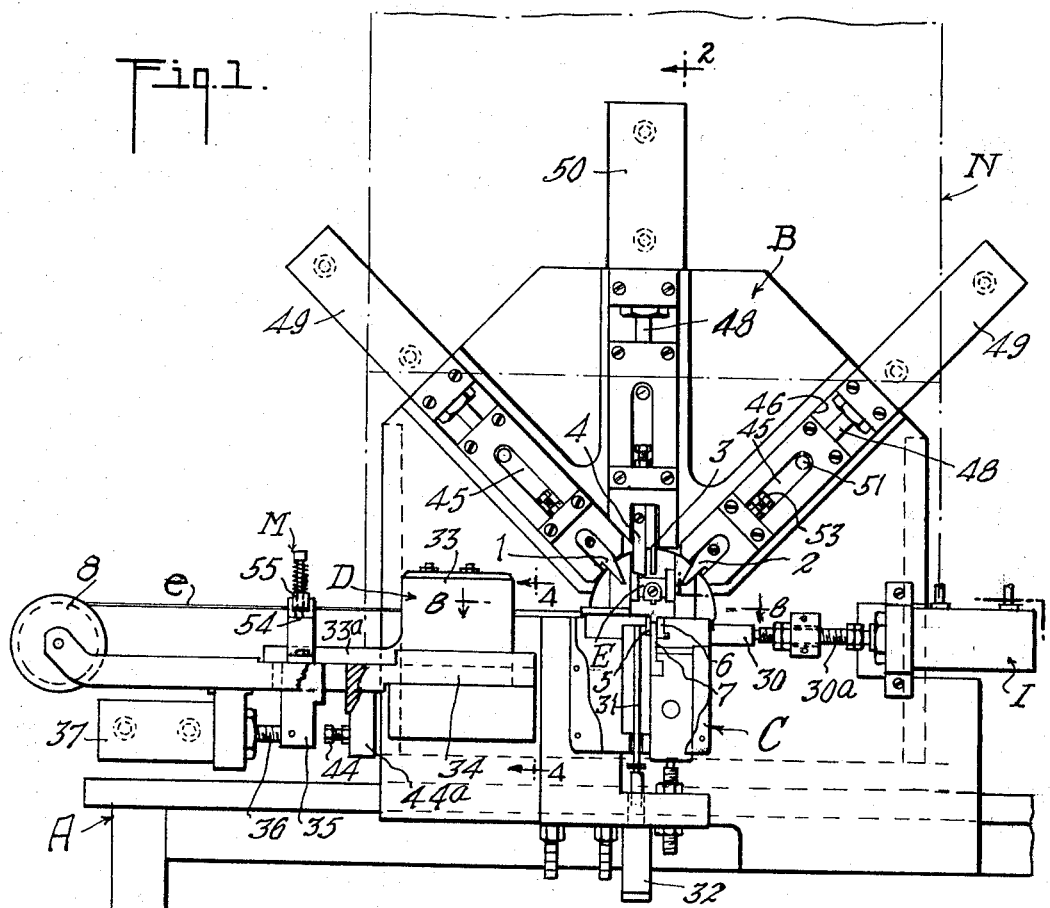
Fig.1.
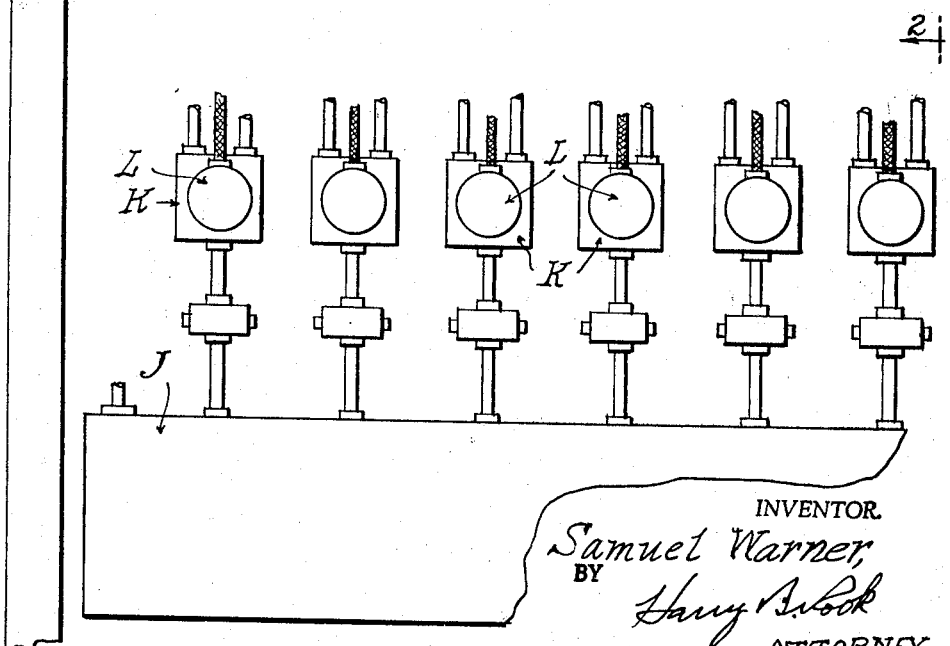
INVENTOR.
Samuel Warner,
BY
Harry B. Cook
ATTORNEY

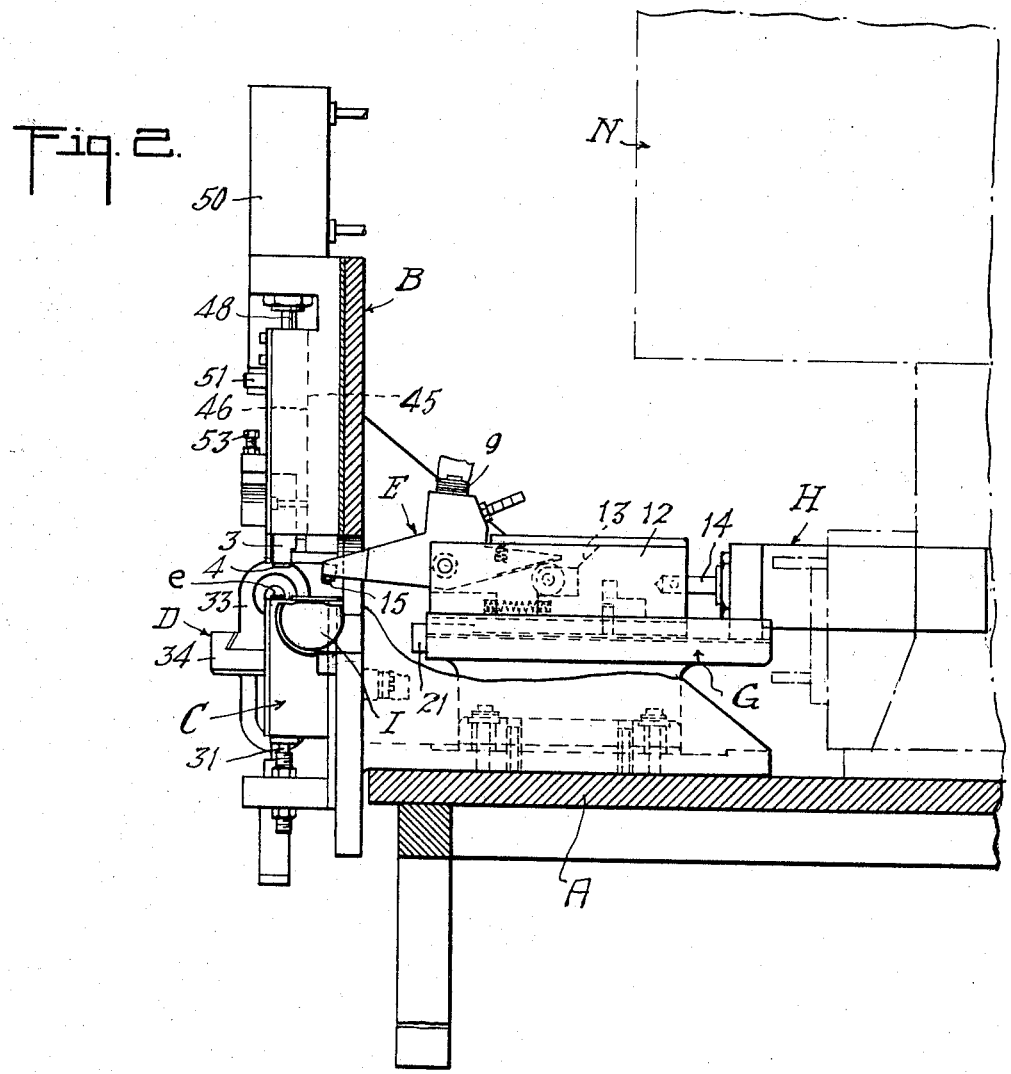
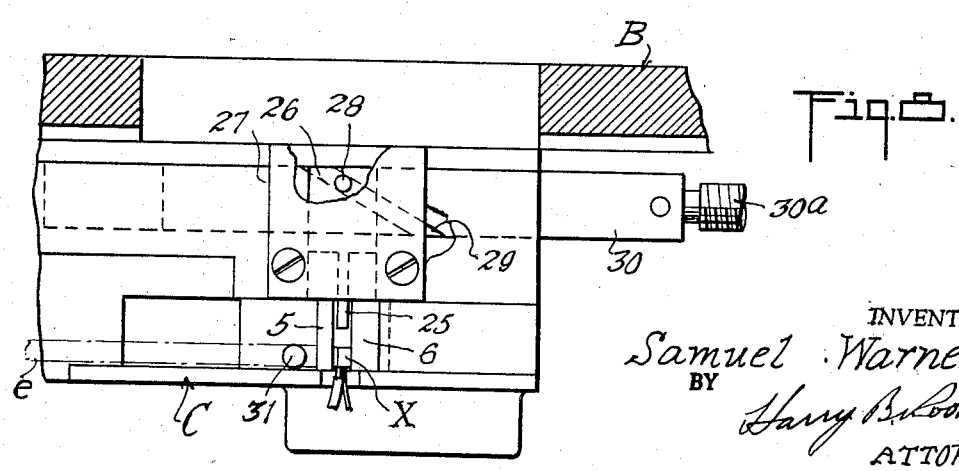

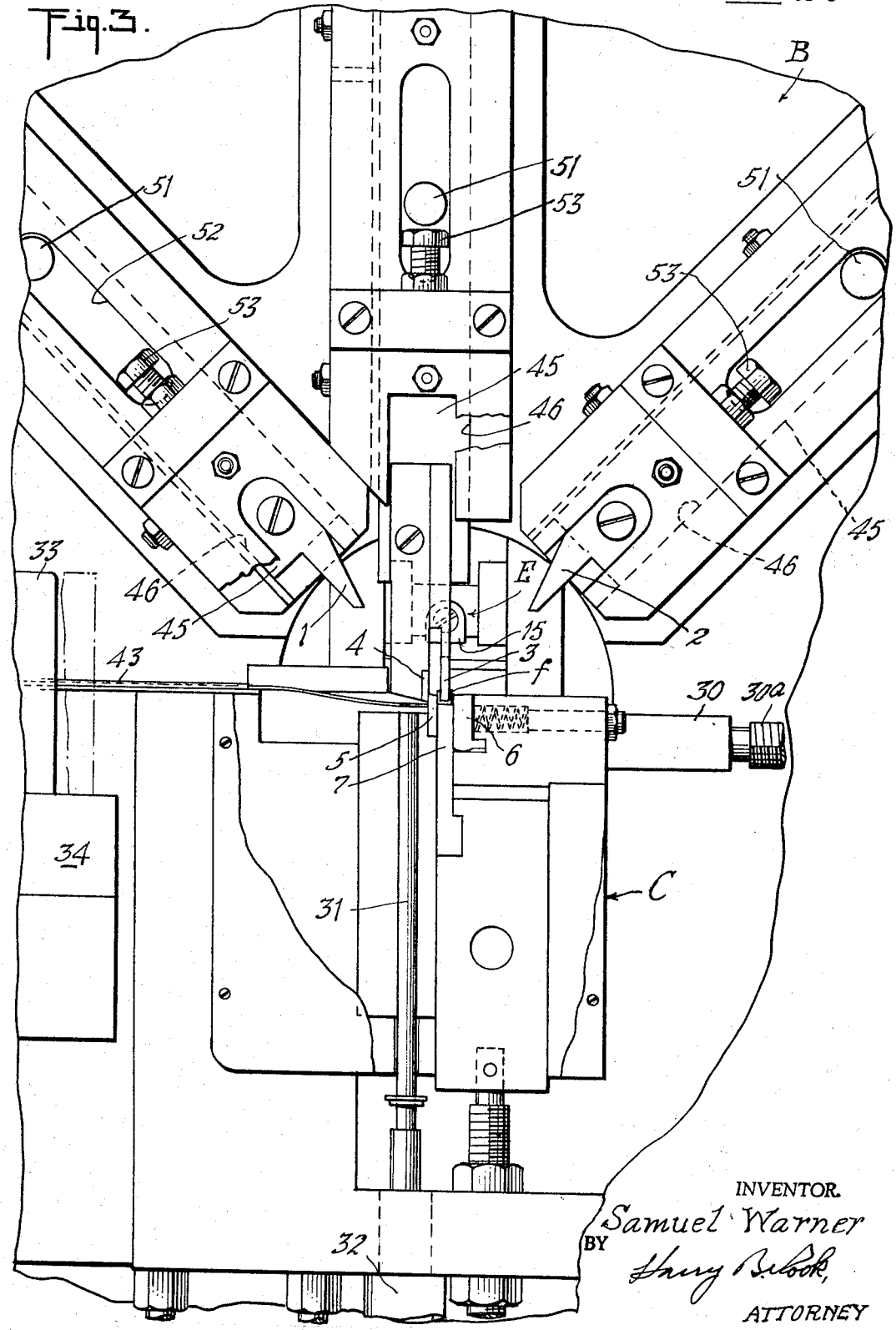

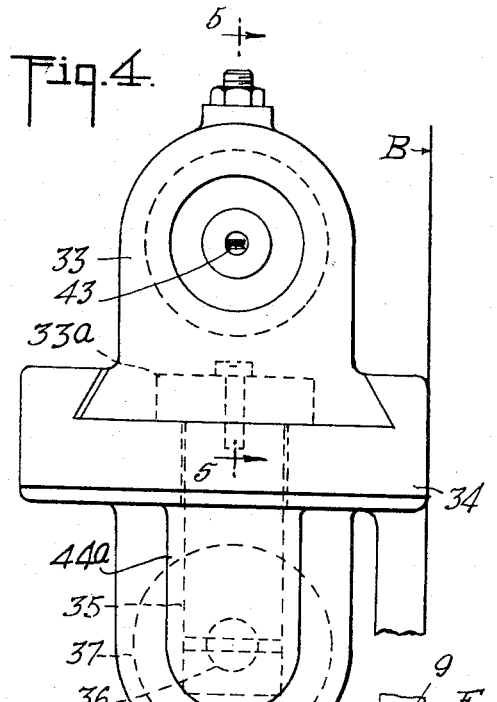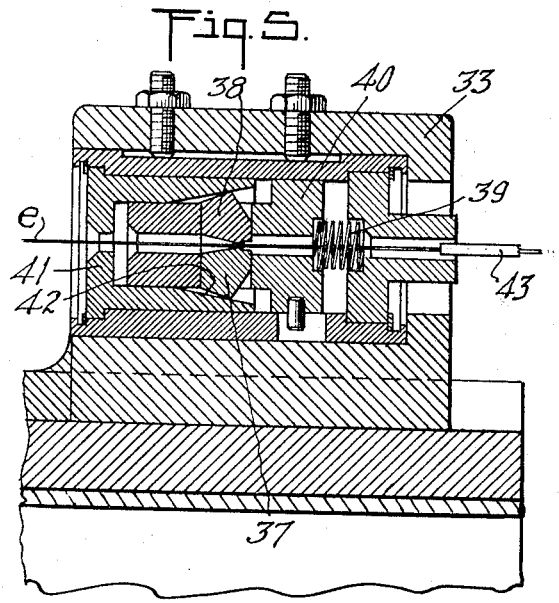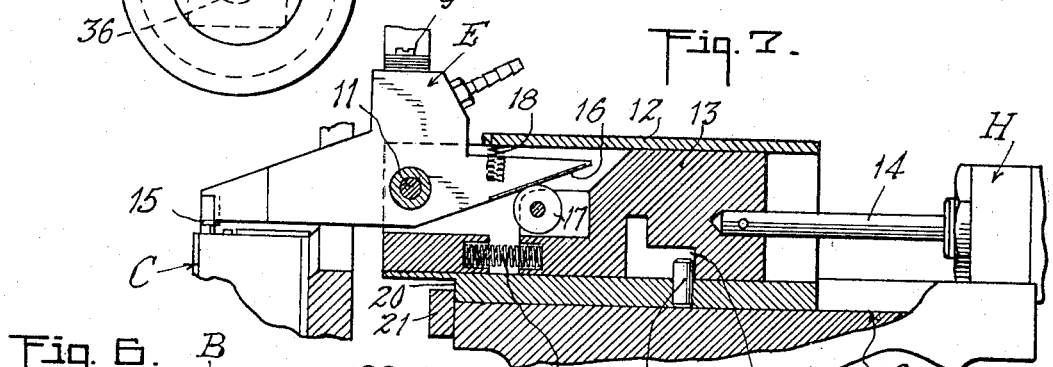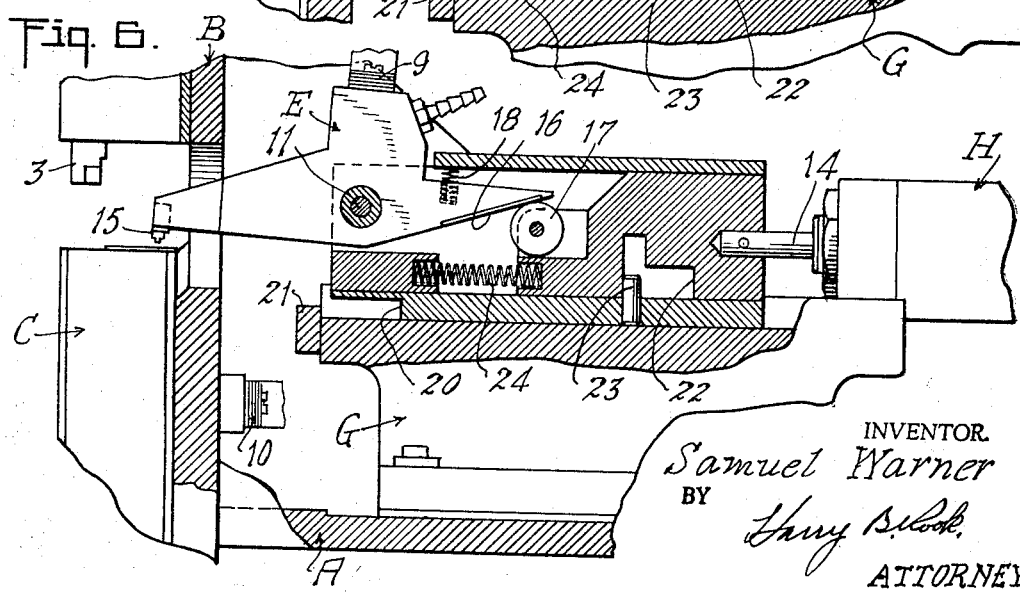

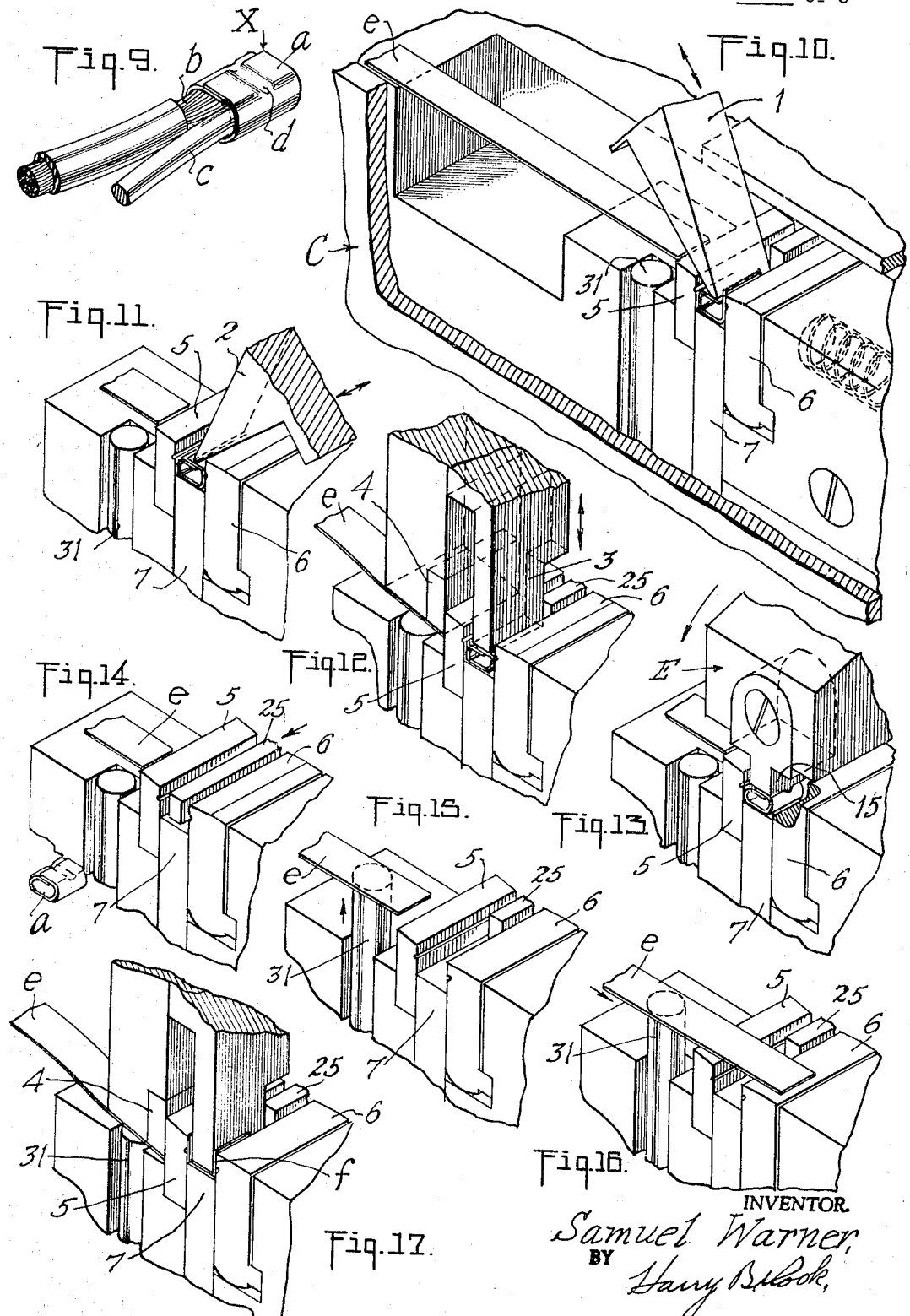

United States Patent Office 3,441,707
Patented Apr. 29, 1969

3,441,707
MACHINE FOR MAKING WIRE TERMINALS
Samuel Warner, Hillside, N.J., assignor to Joyal Mfg. Corp., Long Branch, N.J., a corporation of New Jersey
Filed Aug. 10, 1965, Ser. No. 478,679
Int. Cl. B23k 9/02, 11/02, 11/04
U.S. Cl. 219—103                                    5 Claims

ABSTRACT OF THE DISCLOSURE

A strip of metal is fed longitudinally in steps at the end of each of which the leading end portion of the strip is disposed over a channel-shaped die adjacent which is a fixed cutter blade. A complemental blade and a forming finger are moved together relatively to and cooperate with said fixed cutter blade and said channel-shaped die, respectively, to sever the leading end portion of the strip and to press it into a channel-shape in said die respectively. Two other forming fingers move in succession relatively to the die each to bend one flange of said channel-shaped piece over wires placed in the channel, and there is welding means including an electrode movable in timed relation to said fingers into contact with said flanges to weld them to said wires to complete a wire terminal.

---

This invention relates in general to a method and machine for connecting together a plurality of wires by a clip or terminal piece, and more particularly the invention contemplates the forming and crimping of a strip of metal around the bare ends of a plurality of wires and fusing the strip and wires together.

A primary object of the invention is to provide a novel and improved method and machine of this character wherein a strip of metal is fed to a pre-determined point and bent into a channel-shaped cross section, the wires are placed in the channel and the strip is formed and crimped and fused around the wires in a simple, continuous and relatively inexpensive manner.

Another object is to provide a novel and improved method and machine for the purpose described wherein a long strip of metal is fed step-by-step, the lead end portion thereof is simultaneously severed from the strip and formed into a channel shaped piece, whereupon the wires are fed into the channel, the flanges or arms of the channel shaped piece are successively bent around the wires and into overlapping relation to each other and thereupon the folded or formed piece is crimped and electrically fused around the wires.

Other objects of the invention are to provide such a machine which shall include a novel and improved construction, combination and arrangement of a strip-feeding mechanism, a plurality of forming fingers, cutter blades and electrodes which shall be simple and inexpensive and reliable in operation; and to obtain other advantages and results that will be brought out by the following description in conjunction with the accompanying drawings in which:

FIGURE 1 is a fragmentary front elevation of a machine embodying the invention, showing the parts in normal or rest position;

FIGURE 2 is a fragmentary end elevation thereof taken approximately on the plane of the line 2—2 of FIGURE 1;

FIGURE 3 is an enlarged fragmentary front elevation of the forming fingers, cutter blades and electrodes, showing the cutter blades and one forming finger in operation to form the channel shaped piece of strip metal;

FIGURE 4 is an enlarged end elevational view of the strip-feeding mechanism taken from the plane of the line 4—4 of FIGURE 1;

FIGURE 5 is a fragmentary vertical sectional view approximately on the plane of the line 5—5 of FIGURE 4;

FIGURE 6 is an enlarged fragmentary vertical sectional view through the crimping and fusing mechanism including the upper electrode, with portions shown in the side elevation and with the parts in the normal or rest position;

FIGURE 7 is a similar view showing the parts in operative or crimping and fusing position;

FIGURE 8 is a fragmentary top plan view of the lower electrode and terminal ejecting mechanism taken approximately on the plane of the line 8—8 of FIGURE 1 and showing a completed terminal and with the metal stock strip illustrated by dot and dash lines;

FIGURE 9 is an enlarged perspective view of a completed terminal formed with the method and machine of the invention;

FIGURE 10 is an enlarged fragmentary perspective view of the lower electrode, forming die and the left hand forming finger as viewed in FIGURE 1, illustrating the step of bending one of the flanges of the channel shaped piece, the wires being omitted for clearness in illustration;

FIGURE 11 is a similar view showing the right hand forming finger performing the second step of the forming operation;

FIGURE 12 is a similar view showing the central forming finger completing the forming of the terminal piece;

FIGURE 13 is a like view showing the upper electrode and crimper in crimping and fusing position;

FIGURE 14 is a perspective view showing the ejection of the completed terminal;

FIGURES 15 and 16 are views similar to FIGURE 14 showing the next successive steps of feeding the stock strip and the withdrawal of the ejector; and FIGURE 17 is a view similar to FIGURE 12 but illustrating the cutter blades severing the stock strip and showing the central forming finger forming the severed terminal piece into a channel shape preliminary to the insertion of the wires and immediately preceding the step when shown in FIGURE 10.

For the purpose of illustrating the principles of the invention, the method and machine of the invention are shown for forming a terminal that is best illustrated in FIGURE 9 and which comprises a terminal piece $a$ of strip metal wrapped around the bare ends of two wires $b$ and $c$ and crimped and electrically fused as indicated at $d$ so that the overlapping ends of the strip are secured together and the terminal piece is firmly secured to the wires, thereby to form a terminal.

A desirable machine for practicing the invention includes a table-like support or frame A on which is a superframe structure B that supports strip cutting and forming mechanism which, as viewed in FIGURE 1, includes a left hand forming finger 1, a right hand forming finger 2 and a central forming finger 3 with which is associated an upper cutter blade 4 which cooperates with a lower cutter blade 5 which also constitutes one side wall of a channel-shaped forming die the other side of which is designated 6 and the bottom wall of which is denoted 7, these parts being mounted in a suitable auxiliary frame C which is conveniently mounted on the superframe B.

A stock strip of metal $e$ is fed step-by-step from a roll or reel 8 by a reciprocating feeding mechanism D (FIGS. 1, 4 and 5) so that at the end of each step of movement the leading end portion of the strip lies across the channel between the die walls 5 and 6 as best shown in FIGURE 16, whereupon the central forming finger 3 and the upper cutter blade 4 are actuated from their normal rest positions shown in FIGURE 1 into their operative positions shown in FIGURES 3 and 17 so as to sever the stock strip to provide the terminal piece and at the same time shape or form the terminal piece into a channel as indicated at X in FIGURE 17. The cutter blade and central forming finger are then retracted to their normal position and the wires $b$ and $c$ are inserted manually or automatically into the channel, whereupon the left hand forming finger 1 is actuated from its normal position to bend one flange or arm of the channel downwardly over the wires as shown in FIGURE 10 where the wires are omitted for clearness of illustration. This forming finger is then retracted and the right hand forming finger 2 is actuated to bend the other flange or arm of the channel around the wires and into overlying relation to the first flange as shown in FIGURE 11. Thereupon, the central forming finger is again actuated from its normal position to tightly press the folded terminal piece around the wires as shown in FIGURE 12.

Then the terminal piece is crimped and fused around the wires by a crimping and fusing mechanism that includes an upper electrode E cooperative with a lower electrode F of which the base piece 7 of the forming die may form a part, it being understood that these two electrodes are connected in an electric circuit in any suitable manner. Conveniently, there are binding posts 9 and 10 for the connection of cables to the upper and lower electrodes respectively. Any suitable electric circuit may be utilized within the skill of the art.

The upper electrode is shown as pivotally mounted intermediate its ends on a pivot pin 11 carried by a slide housing 12 that is slidably mounted in a guide standard G which is secured to the top of the table A. Slidably mounted in the slide housing 12 is an actuating block 13 to which is connected one end of the piston rod 14 of a fluid pressure motor that includes the usual cylinder and piston combination H, fluid under pressure to and from which is controlled by any suitable means for the purpose of reciprocating the block 13 alternately in opposite directions. The electrode E has a crimping and fusing head 15 at one end and has a beveled surface 16 on its other end with which coacts a roller 17 journaled on the actuating block 13. A compression spring 24 is shown interposed between the slide housing and the actuating block tending to urge them apart. Normally the electrode is biased by a spring 18 so as to hold the head 15 above the lower electrode as shown in FIGURE 6, and the slide housing and actuating block are at their normal position with the electrode out of the paths of movement of the forming fingers as shown in FIGURE 6. Upon movement of the piston rod 14 in one direction, to the left, in FIGURE 6, the slide housing and actuating block move together until a shoulder 20 on the leading end of the slide housing engages an abutment 21 on the standard G, whereupon the movement of the slide housing stops with the electrode head over the terminal piece but the movement of the actuating block continues in the same direction causing the roller 17 to exert an upward force on the electrode and thereby press the other end of the electrode and the head 15 downwardly into engagement with the terminal piece as shown in FIGURE 7, motion of the actuating block being limited by engagement of one end wall of a recess 22 on the actuating block with a pin 23 in the slide housing as shown in FIGURES 7 and 13. Upon movement of the piston rod 14 in the other direction, to the right in FIGURE 7, the actuating block and slide housing are returned to their rest positions and the electrode is retracted from the die and the lower electrode as shown in FIGURE 6.

It will be understood by those skilled in the art, that the fusing circuit will be automatically closed by any suitable means when the electrode head 15 engages the terminal piece that is resting on the lower electrode and die bottom 7 as shown in FIGURES 7 and 13.

After the crimping and fusing operation, the completed terminal is ejected from the die by an ejecting mechanism which is best shown in FIGURES 1 and 8 and includes an ejector finger 25 projecting from a block 26 that is suitable in a guide housing 27 so that the finger 25 is normally retracted in the lower die channel as shown in FIGURE 8 but can be moved through the die channel in one direction to engage and push the completed terminal (designated X in FIGURE 8) out of the die channel. For actuating the ejector finger, the finger is shown as provided with a pin 28 that projects into a diagonal slot 29 formed in an ejector actuating bar 30 reciprocably mounted in the auxiliary frame C and reciprocated by a fluid pressure motor I mounted on the super-frame B and having its piston rod 30a connected to the ejector actuating bar as best shown in FIGURE 1. Obviously, reciprocation of the piston rod 31 by the motor controlled in the usual way will cause reciprocation of the ejector block 26 and finger 25 so as to alternately push the completed terminal X from the die and then retract the finger to its normal position shown on FIGURE 8.

After completion of each terminal, the stock strip E is fed one step mechanism D from the position shown in FIGURE 14 to the position shown in FIGURE 16, and before the feeding operation begins, the leading end of the strip is elevated to a level above the lower cutter blade by an elevator rod 31 that is reciprocable in the auxiliary frame C and actuated by fluid pressure motor 32 in known manner so as to alternately elevate the strip as shown in FIGURE 15, and retract to its normal position as shown in FIGURES 10–14.

The feeding mechanism D includes a housing 33 slidably mounted in a guide bracket 34 which is suspended from the super-frame B, the housing having an extension 33a to which is connected an arm 35 that is connected to piston rod 36 of a fluid pressure motor 37 which is suspended from the bracket 34. Within the housing 33 is a tapered jaw clutch of generally known construction including jaws 37 and 38 slidable toward and from each other and between which pass the stock strip $e$, the jaws being normally influenced into engagement with the strip by a compression spring 39 that presses a slide ring 40 against the ends of the jaws. The jaws grip the stock strip as the housing is slid toward the die (to the right in FIGURES 1 and 5) there being in the housing a cup shaped jaw guide 41 that has a frusto-conical surface 42 coacting with the jaws. Projecting from the exit end of the housing 33 is a guide tube 43 through which the emerging stock strip is lead from the feeding jaws 37, 38 to a position in proximity to the elevator rod 31 and the die as best shown in FIGURE 1. During movement of the housing and jaws in the opposite direction, to the left in FIGURE 5, the jaws move apart and slip over the stock strip which is yieldingly frictionally held against movement by the guide tube 43 and also preferably by a spring brake M in which the strip is yieldingly frictionally gripped between a base portion 54 rigidly mounted on the bracket 34 and a spring pressed bar 55 mounted on the base 54. An adjustable stop screw 44 is mounted in an arm 44a depending from the bracket 34 to be abutted by the arm 35 for limiting the length of the feeding movements of the housing 33 and thereby varying the length of the steps of movement of the stop strip.

The forming fingers 1, 2 and 3 are shown as mounted and actuated in about the same manner, each of the fingers being mounted on a slide bar 45 that is slidable in a guideway 46 in the super-frame B, the fingers and cutter blade removably mounted on the lower ends of the respective bar in any suitable way, for example by screws. The upper ends of the slide bars are connected to the piston rods 48 of corresponding fluid pressure motors. The motor 50 for the central finger 3 and cutter blade 4 which is mounted on the same bar 45 as the finger, is preferably larger than the motors 49 for the right and left fingers.

Upon movement of the pistons of the motors 49 and 50 in one direction, downwardly in FIGURE 1, the fingers and cutter blade 4 are moved into operative forming and cutting positions, respectively, and upon movement of the pistons in the opposite direction, the fingers and cutter blade are retracted to their normal or rest positions. Preferably each slide bar 45 mounted thereon a stud 51 movable through a slot 52 in the cover plate of the corresponding guide-way 46, to abut an adjustable screw 53 mounted on the super-frame so as to positively limit the movement of the forming fingers into operative or strip folding positions.

Manifestly fluid pressure motors will be operated in timed relation to each other to effect the movements hereinbefore described by suitable means. For example, a fluid pressure surge tank J to which the connected fluid pressure control valves K for the motors may be utilized and an electro magnetic mechanism L may be provided for actuating each valve; and the circuits through the magnets and through the electrodes are preferably controlled by suitable electronic apparatus enclosed in an appropriate housing shown in dot and dash lines and denoted by the reference character N.

It will be seen that the stock strip is severed and the severed portion is formed around and fused to the wires in rapidly successive steps at a single operation station, where the forming fingers and electrodes are approximately radially related to the die, thus ensuring fast and simple operation and consequent economical production.

While the now preferred embodiment of the invention has been illustrated and described, it will be understood by those skilled in the art that modifications and changes can be made in the method and machine within the spirit and scope of the invention.

I claim:

1. A machine for making a wire terminal comprising a frame having thereon means for feeding a strip of metal longitudinally step-by-step to locate the leading end portion of the end of each strip at an operating station, means at said station for severing said leading end portion and simultaneously shaping the severed portion into a channel-shaped piece into which at least one wire is inserted, means for successively bending the flanges of said piece inwardly one over said wires and the other into overlying relation to the first-named flange, and means operative in timed relation to the last-named means for electrically fusing said flanges together and to said wire to complete the terminal, the second-named means including a fixed channel-shaped die and a fixed cutter blade adjacent thereto, and a cutter blade and a forming finger movable together alternately in directions to and away from said die and said cutter blade, respectively and cooperative with said fixed cutter blade and said channel-shaped die, respectively, upon movement in the first-mentioned direction, to sever the leading end portion of the strip and to press it into a channel shape in said die, respectively, and the third-named means including two forming fingers movable in succession and relatively to said die each to bend one of said flanges, said means for electrically fusing together said flanges of the terminal piece including a fixed lower electrode of which said die constitutes a part, a movable upper electrode and means for moving it between a normal rest position and an operative position, said movable upper electrode when in said rest position being disposed in horizontally and vertically spaced relation to said die and out-of-the-way relation to said forming fingers and said cutter blades, and said movable upper electrode when in operative position being disposed in contact with the folded terminal piece in said die.

2. A machine as defined in claim 1 wherein the first-named forming finger is also movable in succession to said third-named means into contact with said inwardly bent flanges to press said flanges tightly around said wires.

3. A machine as defined in claim 1 wherein all of said forming fingers are reciprocable and disposed in approximately radial relation to said die.

4. A machine as defined in claim 1 wherein the upper electrode and the means for moving it includes a slide housing slidable on said frame toward and from said die and in which said electrode is pivotally mounted on a horizontal axis, means limiting movement of said housing toward said die, an actuating block slidable in said housing and means for sliding said block and spring means between said housing and said block, said block having means coactive with said electrode for swinging the electrode upon movement of said actuating block relatively to said slide housing in the direction toward said die to move the electrode into contact with a terminal piece in said die.

5. A machine for making a wire terminal comprising a frame having thereon means for feeding a strip of metal longitudinally step-by-step to locate the leading end portion at the end of each step at an operating station, means at said station for severing said leading end portion and simultaneously shaping the severed portion into a channel-shaped piece into which at least one wire is inserted, means for successively bending the flanges of said piece inwardly one over said wires and the other into overlying relation to the first-named flange, and means operative in timed relation to the last-named means for electrically fusing said flanges together and to said wire to complete the terminal, the second-named means including a fixed channel-shaped die and fixed cutter blade adjacent thereto, and a cutter blade and a forming finger movable together relatively to and cooperative with said fixed cutter blade and said channel-shaped die, respectively, to sever the leading end portion of the strip and to press it into a channel shape in said die, respectively, and the third-named means including two forming fingers movable in succession and relatively to said die and wherein the first-mentioned finger and cutter blade are mounted on a slide bar, and each of the other two fingers is mounted on a slide bar and all of said slide bars are mounted in guide-ways on said frame in approximately radial relation to said die.

References Cited

UNITED STATES PATENTS

| 1,836,497 | 12/1931 | Phelps et al. | 29—203 |
| 2,322,290 | 6/1943 | Gabel | 219—78 |
| 2,915,616 | 12/1959 | Griffin | 219—78 |
| 3,076,255 | 2/1963 | Woolley | 29—630 |
| 2,684,423 | 7/1954 | Hipple | 219—79 |
| 2,391,891 | 1/1946 | Frankel | 29—33.52 |
| 3,299,246 | 1/1967 | Wahl | 219—103 X |

FOREIGN PATENTS 384,212  10/1923  Germany.

JOHN F. CAMPBELL, *Primary Examiner.*

D. C. REILEY, *Assistant Examiner.*

U.S. Cl. X.R.

29—33.52, 203, 628, 629; 72—330; 219—79, 149